June 13, 1944.　　　H. W. SHELTON　　　2,351,460
ELECTRIC GRASS AND WEED CUTTER
Filed Dec. 1, 1942　　　2 Sheets-Sheet 2
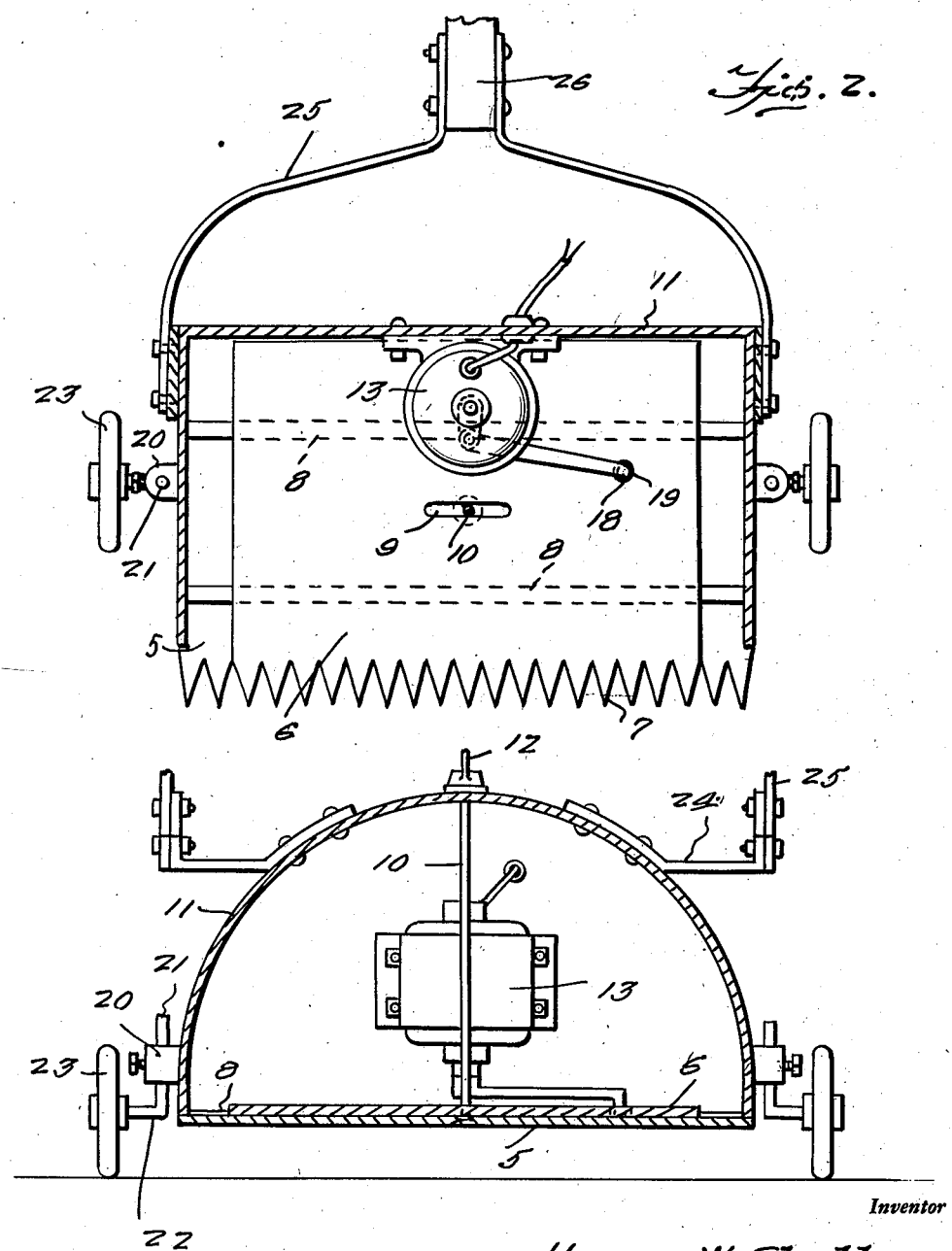
Inventor
Horace W. Shelton
By Clarence A. O'Brien
and Harvey B. Jacobson
Attorneys Patented June 13, 1944

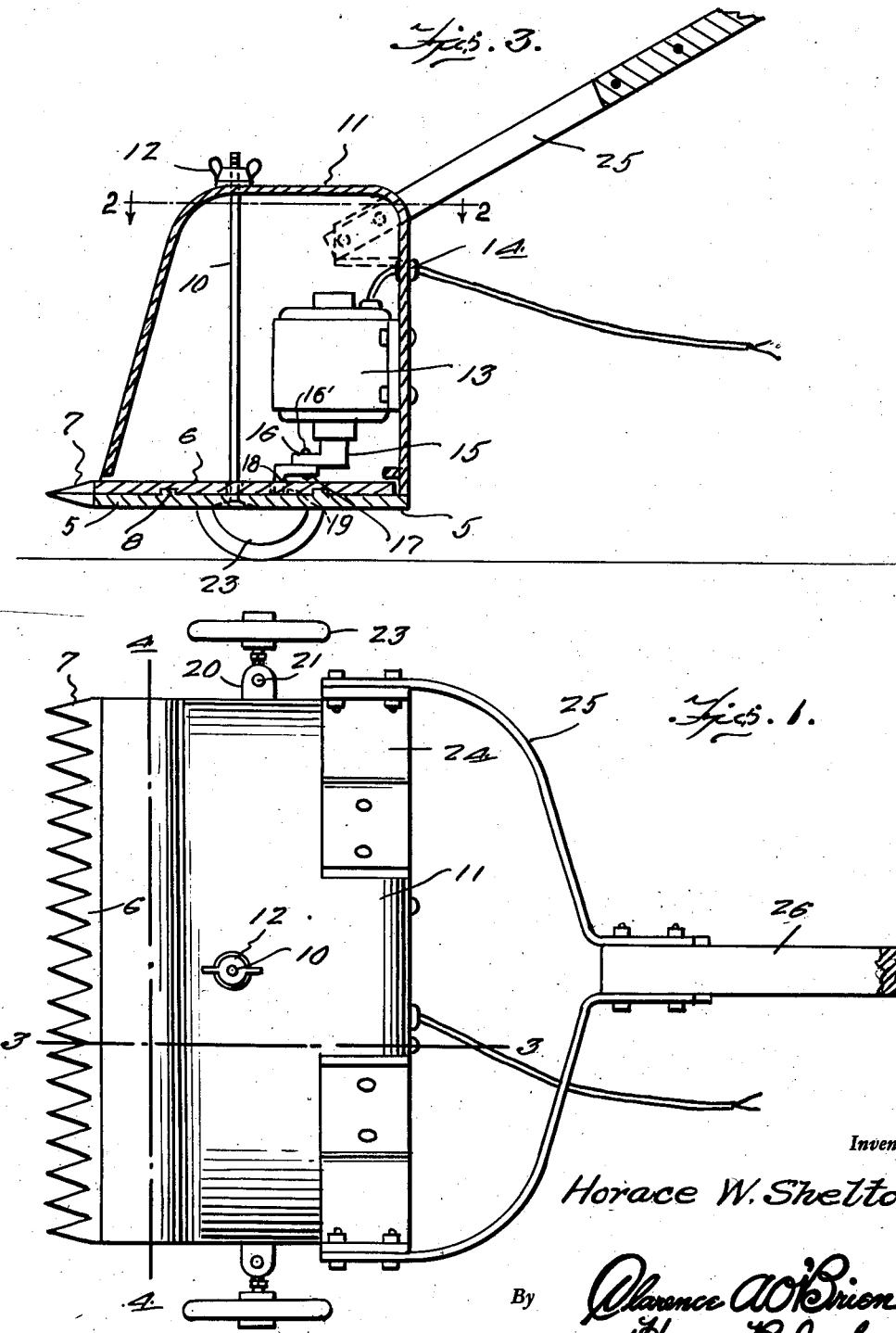

2,351,460

UNITED STATES PATENT OFFICE 2,351,460

ELECTRIC GRASS AND WEED CUTTER

Horace W. Shelton, Palestine, Tex.

Application December 1, 1942, Serial No. 467,499

2 Claims. (Cl. 56—26.5)

This invention appertains to new and useful improvements in cutting devices and more particularly to a powered grass and weed cutter.

The principal object of the present invention is to provide a simple and inexpensive device for cutting grass and weeds through the medium of a small motor driven sickle.

Another object of the invention is to provide a small powered sickle especially adapted for cutting grass and weeds and which will alleviate the operator of considerable strain and labor now expended in the operation of the conventional reel type lawn mower.

Other objects and advantages of the invention will become apparent to the reader of the following description.

In the drawings:

Figure 1 is a top plan view.

Figure 2 is a fragmentary horizontal sectional view taken substantially on a line 2—2 of Figure 3.

Figure 3 is a vertical sectional view taken substantially on the line 3—3 of Figure 1.

Figure 4 is a vertical sectional view taken substantially on the line 4—4 of Figure 1.

Referring to the drawings wherein like numerals designate like parts, it can be seen that the device comprises a bottom cutter plate 5 and a top slidable cutter plate 6, these plates having coacting cutting teeth 7 at the forward edges thereof.

Tongue and groove interlocking means 8 are provided for the plates 5 and 6, and as is shown in Figure 2, the top cutter plate 6 has a slot 9 therein upwardly through which an assembly bolt 10 extends from the plate 5.

Numeral 11 denotes a hood of substantially rectangular shape and having a sloped front. This hood has an opening in the top thereof for receiving the upper end of the assembly bolt 10 and on this end is disposed a wing nut or the like 12.

To the inside of the back wall of the hood 11 is secured an electric motor 13 and conductor wires extend from this motor through a bushing 14 in said rear wall.

The motor 13 has an armature shaft 15 provided with a crank 16 which is connected to a pitman arm 17 by a pin 16', this arm 17 having a downwardly extending pintle 18 at its free end freely disposed into a recess 19 in the slidable cutter plate 6. The pintle 18 is retained in the recess by the bolt 10 which secures the hood 11 on the stationary cutter plate 5.

Apertured ears 20 are provided on the side walls of the hood 11 to receive the upstanding pins 21 on stub axles 22. On the stub axles 22 are wheels 23 for supporting the structure afore-described.

Brackets 24, 24 are provided on the upper portion of the hood 11 and to these are secured arms 25 which are, in turn, connected to a hand bar 26.

It can now be seen that when the motor 13 is energized, the arm 17 will be actuated to reciprocate the cutter plate 6 and this will result in the cutting of any material that comes between the cutting teeth of the blades 5, 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cutting apparatus of the character described comprising a pair of coacting cutting plates each having cutter teeth, a hood having downwardly extending walls, wheels supporting the hood, connecting means between the lowermost plate and the hood, a motor mounted on one of the walls of the hood, one of said plates having a recess, and a pitman arm operatively connected to the motor and having means at its outer end positioned in said recess.

2. A cutting apparatus of the character described comprising upper and lower coacting cutting plates each having cutter teeth, a hood having downwardly extending walls, wheels supporting the hood, a motor mounted on one wall of the hood, said upper plate having a recess, a pitman arm having a downturned end positioned in the recess, and connecting means between the lowermost plate and the hood for securing the lower plate against the bottom of the hood, said connecting means consisting of an assembly bolt extending upwardly from the lower plate through a slot in the upper plate and through an opening in the upper portion of the hood, the upper portion of the assembly bolt being provided with a nut.

HORACE W. SHELTON.